United States Patent Office 3,095,417
Patented June 25, 1963

3,095,417
PROCESS FOR THE PREPARATION OF PIPERAZINE
Fédor Poppelsdorf, Charleston, and Richard C. Myerly, South Charleston, W. Va., assignors to Union Carbide Corporation, a corporation of New York
No Drawing. Filed July 20, 1960, Ser. No. 44,005
4 Claims. (Cl. 260—268)

This invention relates to a novel process for the preparation of piperazine.

More specifically, this invention relates to an improvement in the process of preparing piperazine by the pyrolysis of monoethanolamine hydrohalides.

The preparation of piperazine by the pyrolysis of monoethanolamine hydrohalides is well known in the art. However, the productivities obtained when the reaction was conducted in the absence of a catalyst, were unsatisfactory. In an attempt to increase the efficiency of the reaction, the art resorted to the use of catalysts. The catalysts which are known in the art include zinc, iron, aluminum and magnesium halides, boric acid, ammonium chloride, and ammonium bromide.

However, none of the catalysts known to the art were satisfactory. In fact, actual experiments have shown that the yield obtained, when some of these catalysts were used, were far below the yields claimed. In other cases, the yields with these catalysts were no better than the yields obtained in non-catalytic pyrolysis.

Thus, it is an object of this invention to provide an economical and efficient process for the production of piperazine.

The process of this invention has at least two advantages over the prior art—it makes possible the economical operation of a process below 250° C. and it provides increased productivities at a given reaction temperature.

The fact that the reaction proceeds at temperatures lower than 250° C. is important for at least two reasons. The pyrolysis of monoethanolamine hydrohalide is a very corrosive reaction. Thus, it is necessary to line the reactor to protect it from attack from the reaction products. The materials which are used as liners are tantalum, ceramic and glass. It is economically desirable to use glass as a liner because of its cost. However, glass-lined equipment does not stand up satisfactorily at temperatures above 250° C. The process of this invention allows glass to be used since it is conducted below 250° C.

Additionally, carbonization of the reaction product increases with temperature. The use of a lower temperature produces less carbonization which renders the product less viscous and easier flowing. This is an important feature in a continuous process.

It has now been discovered that the above objects can be obtained by carrying out the pyrolysis of monoethanolamine hydrohalides in the presence of a catalyst selected from the class consisting of hydrogen chloride, hydrogen bromide, hydrogen iodide and hydrogen fluoride.

The monoethanolamine hydrohalides which can be employed as starting materials are monoethanolamine hydrochloride, hydrobromide, hydroiodide and hydrofluoride.

The effect of the catalyst on the yields of piperazine can be shown from the following table in which the catalyst is hydrogen chloride and the hydrohalide is monoethanolamine hydrochloride.

TABLE I[a]

| Reaction Temperature, ° C. | Reaction Time, Minutes | Hydrogen Chloride Passed through Reaction Mass | Yield of Piperazine, Percent |
|---|---|---|---|
| 220–225 | 330 | Yes [b] | 36.7 |
| 220 | 330 | No | 8.9 |
| 220–225 | 330 | No [c] | 0.8 |
| 245–250 | 60 | Yes [b] | 11.7 |
| 245–250 | 60 | No | nil |

[a] All experiments were done at atmospheric pressure with continuous stirring.
[b] Hydrogen chloride gas passed into the reaction mass at the rate of 1.67 moles per hour per mole of monoethanolamine hydrochloride.
[c] Dry nitrogen passed into the reaction mass at the rate of 1.5 moles per hour per mole of monoethanolamine hydrochloride.

The temperatures at which the reaction can be conducted are from about 215° C. to about 250° C. The preferred range is from 220° C. to 230° C., at atmospheric pressure.

Monoethanolamine hydrohalide is first prepared by treating monoethanolamine with an anhydrous hydrogen halide. The particular proportions are not narrowly critical. The preferred concentration is a 1:1 molar ratio. The monoethanolamine hydrohalide formed is brought to the desired reaction temperature and anhydrous hydrogen halide, preferably hydrogen chloride, is passed through the molten mass with stirring. The amount of catalyst passed through at atmospheric pressure can be from 0.1 to 4.0 moles per hour per mole of monoethanolamine hydrohalide at temperatures from 215° C. to 250° C. The preferred range is 0.1 to 0.9 moles per hour.

The following table illustrates the effect of hydrogen chloride flow rate on the yield of piperazine.

TABLE II

Dependence of the Catalytic Effect on Hydrogen Chloride Flow Rate [1]

| Hydrogen Chloride Flow Rate, Moles Per Hour Per Mole Monoethanolamine HCl | Yield of Piperazine, Percent |
|---|---|
| 0.42 | 6.1 |
| 0.58 | 32.7 |
| 0.80 | 36.5 |
| 1.67 | 36.7 |
| 4.40 | 35.0 |

[1] Reaction temperature and time for each experiment were 220 to 225° C. and 330 minutes, respectively.

As will be noted from Table II there is no advantage in increasing the flow rate beyond 0.80 mole per hour per mole of monoethanolamine hydrochloride when operating at this temperature range.

It is to be understood that at pressures higher than atmospheric lesser flow rates of catalyst will be operable since the hydrogen halides are then more soluble in the reaction mixture. It would appear that the flow rate at any pressure should be sufficient to maintain a molar ratio of monoethanolamine to anhydrous hydrogen halide of at least 1:1.

The pyrolysis can also be conducted in the presence of an inert dispersant. The nature of the dispersant is not critical. The only condition being that it is inert under the reaction conditions. Examples of dispersants include mineral oil, diphenyl ether, phenyl diphenyl ether, etc. The concentration of the dispersant is not critical and can be from 30–120 grams per mole of amine hydrohalide starting material.

The following table illustrates the catalytic effect of anhydrous hydrogen chloride when the reaction is carried out in an inert dispersant.

TABLE III

*Evidence for the Catalytic Effect of Hydrogen Chloride on the Pyrolysis in an Inert Dispersant of Monoethanolamine Hydrochloride to Piperazine* [a]

| Reaction Time, Hrs. | Hydrogen Chloride Passed through Reaction Mass | Dispersant [b] Grams per mole of Monoethanolamine HCl | Yield of Piperazine, Percent |
|---|---|---|---|
| 2 | No  | 60    | 8.6  |
| 2 | Yes | [c] 60  | 31.8 |
| 4 | No  | 60    | 26.6 |
| 4 | Yes | [c] 60  | 39.6 |
| 4 | Yes | [c] 120 | 39.4 |

[a] All experiments were done at 245 to 250° C. at atmospheric pressure with continuous stirring.
[b] Mineral oil, B. Pt. >300° C.
[c] Anhydrous hydrogen chloride passed into the reaction mixture at the rate of 1.67 moles per hour per mole of monoethanolamine hydrochloride The following examples illustrate the invention.

EXAMPLE I

Anhydrous hydrogen chloride (219.0 g., 6 moles) was slowly passed with stirring into monoethanolamine (366.5 g., 6 moles). The resulting monoethanolamine hydrochloride was rapidly heated with stirring to 220–225° C., whereupon hydrogen chloride was passed continuously through the molten hydrochloride at the rate of 10.0 moles per hour, the gas being introduced by means of a sparging tube placed as far below the liquid surface as possible.

The reaction mass was held with stirring under these conditions for 5½ hours.

At the end of the reaction period, the product was cooled to about 120° C. and then made strongly alkaline to phenolphthalein by the addition of sodium hydroxide solution (aqueous 50 percent).

Diethylenetriamine (500 g.) was added to serve as a distillation aid and pot-boiler after which the mixture was distilled with stirring at atmospheric pressure. Piperazine (94.8 g.) distilled over in a yield of 36.7 percent.

EXAMPLE II

The procedure of Example 1 was followed excepting that the hydrogen chloride treatment was omitted. Piperazine was obtained in a yield of 8.9 percent.

EXAMPLE III

The procedure of Example 1 was followed excepting that the reaction temperature and time were 245–250° C. and one hour respectively. Piperazine was obtained in a yield of 11.7 percent.

EXAMPLE IV

Example 3 was repeated but with omission of the hydrogen chloride treatment. No piperazine was obtained.

EXAMPLE V

Monoethanolamine hydrochloride (6 moles) was rapidly heated with stirring to 220–225° C. whereupon anhydrous hydrogen bromide was passed continuously through the molten hydrochloride at the rate of 2.35 moles per hour, the gas being introduced by means of a sparging tube placed as far below the liquid surface as possible.

The reaction mass was held with stirring under these conditions for 5½ hours.

At the end of the reaction period, the product was cooled to about 120° C. and then made strongly alkaline to phenolphthalein by the addition of sodium hydroxide solution (aqueous 50 percent).

Diethanolamine (500 g.) was added to serve as a distillation aid and pot-boiler after which the mixture was distilled with stirring at atmospheric pressure. Piperazine (74.2 g.) distilled over in a yield of 28.7 percent.

What is claimed is:

1. In the process for preparing piperazine by the pyrolysis of monoethanolamine hydrohalide to piperazine and recovering piperazine from the pyrolysis mixture, the improvement which comprises the step of passing anhydrous hydrogen halide through the monoethanolamine hydrohalide pyrolysis mixture maintained at a temperature from about 215° to 250° C. at an hourly rate of flow from 0.58 to 4.40 moles of hydrogen halide per mole of monoethanolamine hydrohalide.

2. The process of claim 1 wherein the monoethanolamine hydrohalide is monoethanolamine hydrochloride and the hydrogen halide is hydrogen chloride.

3. The process of claim 2 wherein the temperature is 220° to 230° C.

4. The process of claim 2 wherein the monoethanolamine hydrohalide is maintained in an inert liquid dispersant.

References Cited in the file of this patent

UNITED STATES PATENTS 2,839,533    Scigliano et al.    June 17, 1958

FOREIGN PATENTS 595,430    Great Britain    Dec. 4, 1947
819,126    Great Britain    Aug. 26, 1959